W. L. MORRIS.
Machine for Cutting Wooden Cogs.
No. 198,309. Patented Dec. 18, 1877.
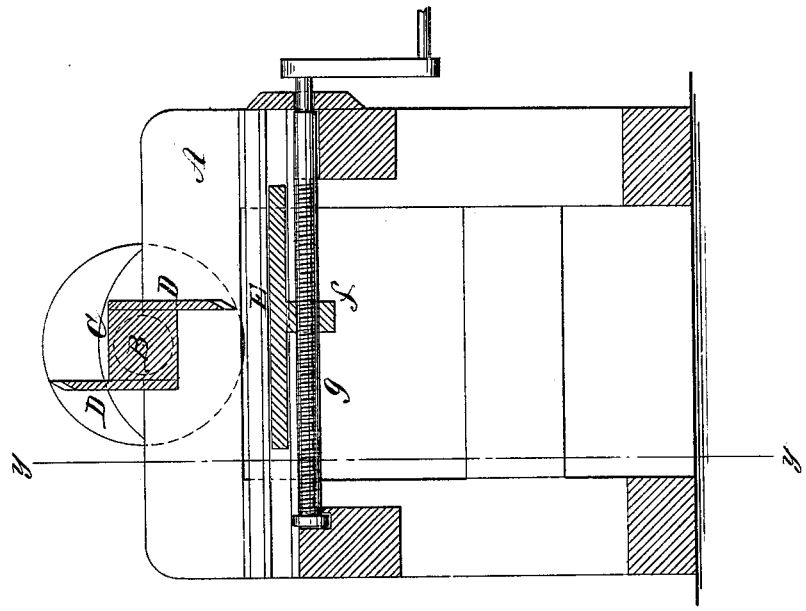
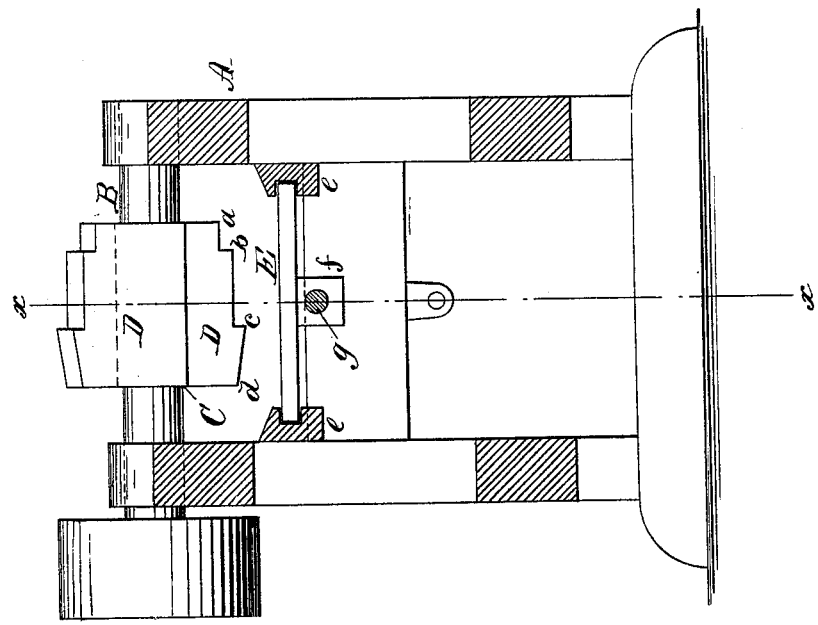
WITNESSES:
H. Rydquist
J. H. Scarborough
INVENTOR:
W. L. Morris.
BY Munn & Co
ATTORNEYS.

UNITED STATES PATENT OFFICE.

WARREN L. MORRIS, OF VICTORY, GEORGIA, ASSIGNOR OF ONE-HALF HIS RIGHT TO J. W. MORRIS AND G. W. MORRIS, OF SAME PLACE.

IMPROVEMENT IN MACHINES FOR CUTTING WOODEN COGS.

Specification forming part of Letters Patent No. 198,309, dated December 18, 1877; application filed July 23, 1877.

*To all whom it may concern:*

Be it known that I, WARREN L. MORRIS, of Victory, in the county of Carroll and State of Georgia, have invented a new and Improved Machine for Making Cogs, of which the following is a specification:

Figure 1 is a front elevation, in section, on line $y\ y$ in Fig. 2; and Fig. 2 is a vertical section taken on line $x\ x$ in Fig. 1.

Similar letters of reference indicate corresponding parts.

The object of my invention is to provide a machine for rapidly and accurately forming wooden cogs for mortise-wheels.

In the drawing, A is a frame, made sufficiently solid to sustain the running parts of the machine; and B is a shaft, journaled in the said frame, and having fixed to it a cutter-head, C, to which two knives or cutters, D, are attached. These cutters are of suitable form to shape the sides of the cog from a piece of wood carried under them by the table E.

The part $a\ b$ of the knives cuts the outwardly-projecting part of the cog, the part $b\ c$ cuts the tenon that fits the mortise of the wheel, and the part $c\ d$ cuts the dovetail tenon that projects from the inner surface of the rim of the wheel for receiving the key that holds the cog in the wheel.

The movable table E slides in grooved pieces $e$, attached to the sides of the frame A. A nut, $f$, is attached to the under side of the table, and through it a screw, $g$, passes, that is journaled in the frame A, and is provided with shoulders that prevent it from moving longitudinally.

The wood from which the cogs are made is sawed into pieces of the required size, which pieces are secured to the table E, and by it they are carried under the rapidly-rotating cutters D, the table being moved by turning the screw $g$. When one side of all the cogs is cut, a suitable support is placed on the table E, and the other side is formed.

By means of my improved machine a saving in time and labor is effected, and the work is accurately done.

I do not, of course, claim a rotating cutter-head in combination with a table adjusted by a screw; but

Having thus described my invention, I claim as new and desire to secure by Letters Patent—

In a machine for making wooden cogs for cog-wheels, the cutter-head, formed of the rotary shaft and its attached knives D, each having three cutting-edges formed in different planes—first, the edge $a\ b$, for cutting the working end of a cog; second, the edge $b\ c$, for cutting the tenon that fits in the mortise of the cog-wheel; third, the edge $c\ d$, for cutting the inner end or shank of a cog for receiving a key for securing the cog in the wheel-rim, all as shown and described.

WARREN LAURENCE MORRIS.

Witnesses:
ELISHA F. GARRETT,
JAMES M. GARRETT.